Dec. 7, 1954     H. W. DIAMOND     2,696,248

SINGLE EFFECT FLASH EVAPORATOR

Filed May 26, 1951     2 Sheets-Sheet 1

INVENTOR.
Horace W. Diamond
BY Brown, Jackson,
Boettcher & Dienner
Attys.

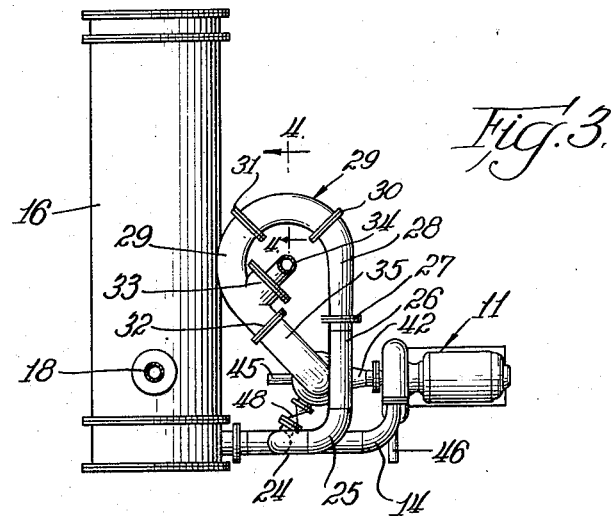
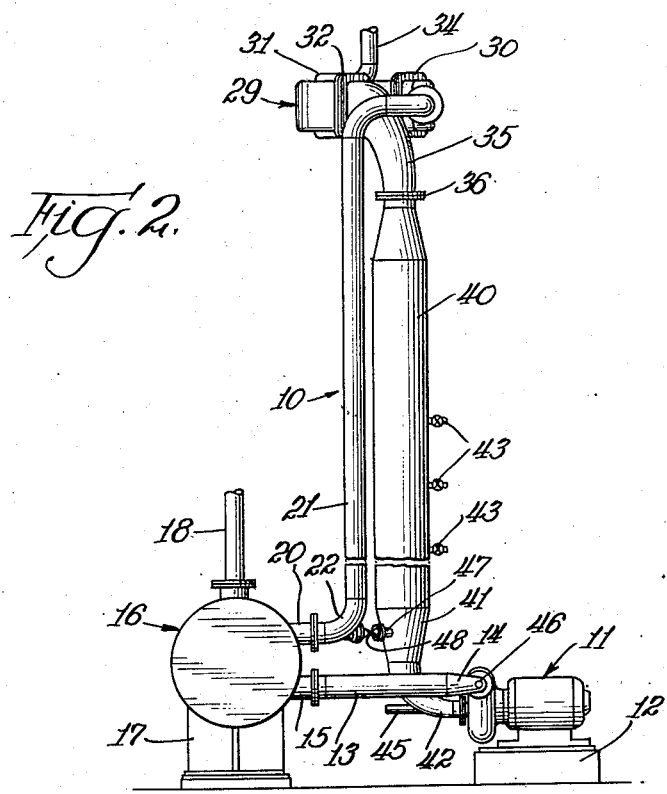

United States Patent Office 2,696,248
Patented Dec. 7, 1954

2,696,248

SINGLE EFFECT FLASH EVAPORATOR

Horace W. Diamond, Chicago, Ill., assignor to Morton Salt Company, Chicago, Ill., a corporation of Illinois Application May 26, 1951, Serial No. 228,503

3 Claims. (Cl. 159—2)

My invention is concerned with a new and improved evaporating apparatus for separating vapor from salt carrying liquids or the like. More particularly, my invention is directed to a new and improved single effect flash evaporator of a forced circulation type which may be operated at atmospheric pressure or under vacuum as desired and in which the separation of the vapor and salt carrying liquids is accomplished in an efficient manner by the influence of centrifugal and centripetal forces.

Briefly, my invention contemplates an evaporating apparatus in which a liquid, such as salt brine from which the solids entrained therein are to be separated eventually, is forced through a heat exchanger under pressure and then driven at high velocities through an improved centrifugal flasher and separator which serves to efficiently separate the brine into vapor and salt carrying liquor by centrifugal and centripetal forces; the vapor being drawn off under vacuum or at atmospheric pressure.

Among the many objects of my invention, the foremost is that of teaching the construction and functioning of a new and improved single effect flash evaporator in which the desired separation of the vapor from a salt carrying liquid is partially carried on by normal boiling and vaporizing of the liquid, but is further enhanced and accelerated in its action by the employment of centrifugal and centripetal forces.

Another object of my invention is to disclose the features of a new and improved evaporating device in which the salt carrying liquor and vaporized liquid are maintained at high velocities during the combined centripetal and centrifugal separation thereof to permit a more efficient demarkation therebetween with a minimum entrainment effect.

Another object of my invention is to disclose a new and improved enclosed centrifugal separating section for my forced circulation evaporator wherein the vapors are removed from the salt carrying liquor and withdrawn from the centrifugal separating section in such a manner as to cause a minimum of turbulence and interference with the flow of the salt liquor and volatilized fluids.

The above and further objects and advantages of my invention will be recognized by one familiar with the art from the following description thereof and with reference to the accompanying drawings.

In the drawings:

Figure 2 is a foreshortened end elevational view of the evaporating apparatus illustrated in Figure 1;

Figure 3 is a top plan view of the apparatus shown in Figures 1 and 2; and

Figure 1:
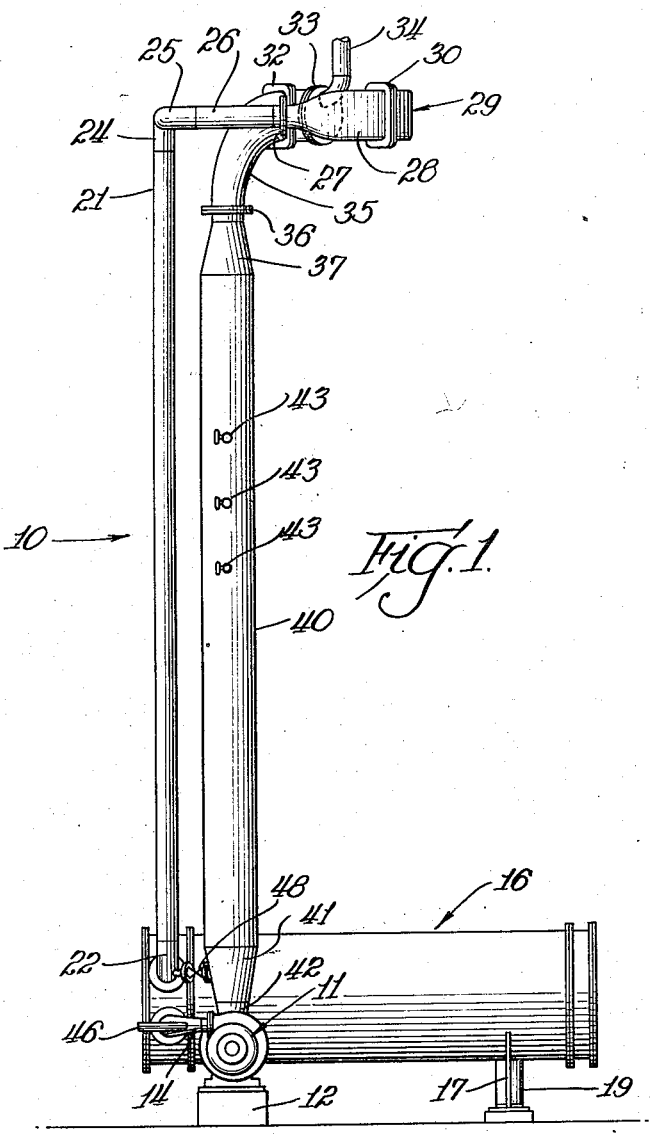
Figure 1 is a front elevational view of an evaporating apparatus made in accordance with the teachings of my invention.

Turning now to the structural details of my evaporator apparatus 10, illustrated in the drawings: From Figures 1 through 3, it will be recognized that I have provided a pump unit 11 suitably supported on the ground or floor by a pedestal 12. The pump as herein illustrated is a single phase, centrifugal type such as the commercially available model No. 5–CRVL Ingersol Rand Pump which is designed to have a capacity of 1400 gallons per minute at a 50 foot head and is powered by a 30 H. P. motor at 1750 R. P. M. Other suitable pumps are likewise available for this purpose, their size and capacity being dependent and determined by the size of the installation which they serve. Leading from the pump unit 11 is a horizontal discharge line 13, which for the particular pump designated above is an 8" tubular line or pipe. However, since the pump 11 is provided with a 5" diameter discharge opening, an 8" x 5" reducing pipe coupling 14 interconnects line 13 with the discharge side of the pump 11. Discharge line 13 leads to and is coupled with a short intake pipe 15 associated with a heat exchanging unit 16 which is suitably supported on laterally spaced ground engaging pedestals 17 or the like. It will be recognized that the heat exchanger is substantially cylindrical in shape and is mounted in a horizontal reclined position. The particular heat exchanger herein illustrated is a six pass type marketed by the Goslin-Birmingham Manufacturing Company and having a 48" outside diameter. Two passes of the exchanger carry steam, and the several 14 gage globiron heat exchanging tubes therein have a 1¼" outside diameter and a length 12' to provide a total inside heating surface of 1715 sq. ft. Steam is provided to the heat exchanger unit 16, via a 6" steam line 18 feeding vertically into the upper top portion thereof, under a pressure of 15 lb. gauge at a rate of 5,000 lbs. per hour. After passing through the exchanger the steam is passed outwardly therefrom through a lower condensate pipe 19 as seen in Figure 1.

Leading from the heat exchanger is a short 8" diameter discharge pipe 20 similar to the 8" diameter inlet line 15 for carrying the heated liquid to the flasher separating section of my device as will appear presently. Positioned in right angular relation to the outlet line 20, is a vertically extending 8" diameter discharge line 21 which is of a like diameter with the discharge pipe 20; such being connected to the latter by means of an upwardly turned right angular elbow pipe connection 22. Line 21 which discharges from the exchanger 16 to the flasher, may be in the order of some 25' in length and is provided at its upper end with a right angularly turned elbow member 24 of a like 8" diameter tubing. It will be recognized that the elbow 24 lies in vertical co-planar relation with elbow 22 to extend outwardly at right angles to discharge line 21. Leading from elbow 24 is a second elbow connection 25 which provides another right angular bend, but in transverse horizontal relation to the plane of the elbows 22 and 24. The several elbows 22, 24 and 25 are all of like 8" diameter. From elbow 25 a short interconnecting 8" diameter line 26 is extended horizontally which connects with a flange coupling 27 communicating with divergently opening throat section or flasher portion 28 having a circular configuration on its end adjacent line 26, but being shaped substantially rectangular on its opposite end to connect to a continuing U-shaped rectangular separator tube 29 through means of a suitable flanged coupling 30. Similar flange couplings 31 and 32 are provided along the curved length of the tubing 29 for interconnecting several shortened curvilinear sections thereof. Intermediate couplings 31 and 32 is provided a transversely positioned flange and outlet 33 from whence leads an upwardly turned 6" diameter vapor outlet 34. From coupling 32 a reducing tubular neck member 35 leads downwardly for connection with a flanged joint 36 positioned at its lower end; coupling pipe 35 changing from a rectangular cross section at its junction with flange 32 to a 12" circular diameter at its lower end at joint 36. Flange joint 36 serves to connect reducing neck member 35 with a conical reducer connection 37 which is 12" in diameter at its connection with the 12" circular reduced end of the reducing neck tube 35, but is flared outwardly at its lowered end to a 20" circular diameter. A vertical tail pipe 40 leads downwardly from the reducing neck member 37; such being a 20" diameter pipe and leading eventually to the suction side of pump member 11 via a second 20" to 12" diameter reducing neck member 41 which connects at its lower end with a right angle connecting elbow 42 which further reduces from the 12" diameter at its upper end to a 5" diameter outlet suitable for connection with the 5" diameter pump suction inlet. At suitable intervals along the length of the tail pipe 40 are positioned three petcocks 43 which are utilized to determine the height of liquid within the tail pipe 40.

A brine feed intake 45 is provided adjacent the suction side of pump 11 by means of a small 1½" nipple pipe connection which leads tangentially into the elbow bend of the reducing elbow connection 42. Similarly, a slurry discharge is provided by means of a 1½" diameter nipple pipe 46 leading tangentially from the discharge elbow connection 14 on the discharge side of the pump, as seen clearly in Figure 3 of the drawings. It, of course, will be understood that the several connections of the elbows and piping heretofore set forth are made in a sealed, airtight manner to prevent the escape of fluids at the several interconnecting joints; such being accomplished either by flanged connections or by welding as desired. If desired, the flasher unit and centrifugal separating tube 29 may be by-passed entirely. For this purpose a short 4" cross connecting line 47 provided with a shut off valve 48 is provided interconnecting between the vertical discharge line 21 and the tail pipe 40 near their lower ends, as shown in Figure 2 of the drawings.

Use and operation

Figure 4:
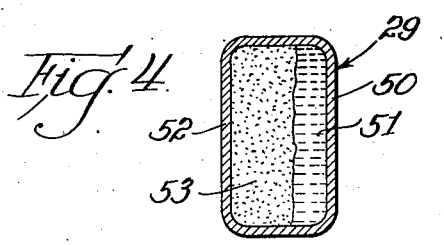
Figure 4 is an enlarged cross-sectional view of the centrifugal separating section of my evaporating apparatus taken substantially along line 4—4 of Figure 3 and looking in the direction of the arrows therein.

In operating a flash evaporator as set forth heretofore, brine is introduced to the system through the 1½" brine feed nipple 45 until a sufficient amount brine is stored in the discharge tail pipe 40 to provide a satisfactory reservoir for pump 11; such being determined by the petcocks 43. The pump then delivers the brine to the heat exchanger 16 where it is passed through the several tubes thereof under pressure to receive heat from the steam fed thereto via inlet 18 under 15 lb. gauge pressure at approximately 5,000 lbs. per hour in the particular installation illustrated. As the heated brine leaves the heat exchanger 16 and enters the discharge line 21 leading to the flasher throat portion 28, its temperature is in the neighborhood of from 230° to 235° F.; it being desirable that this temperature should not exceed 250° F. As the heated brine approaches the rectangular tube 29 it commences to volatilize and boil with the accompanying force of rapid expansion in throat portion 28 serving to move the brine into the separator tube 29 at a high velocity; this high velocity which results from the rapid expansion of the liquid serving to assist the lateral separation by the accompanying centrifugal and centripetal forces as the liquid surges through a turn of 180° or more in the flasher unit. As the boiling and expanding liquid flows around the U-shaped separator tube 29, centrifugal force throws the heavier salt carrying liquor to the outside wall or curve 50 of the tube 29, as illustrated in Figure 4 of the drawings, wherein the salt carrying liquor is indicated generally at 51. The volatilized liquid in the form of steam or vapor will conversely occupy the area adjacent the inside curve or wall 52 of tube 29; as indicated generally at 53 in Figure 4, such vapor 53 being centripetally forced toward the inside curve by the molecular movement under centrifugal force of the heavy salt carrying liquor to the outside curve of tube 29.

It will be recognized that this centrifugal action serves effectively to separate the heavier salt carrying liquor and the volatilized or vaporized liquid, the latter of which normally exists in the form of steam. Since, the tubes 28 and 29 are positioned substantially horizontally there is little or no gravitational effect exerted on the vapor and the salt carrying liquor to cause mixing of small particles of the liquor and the steam and vice versa. Likewise, by virtue of the substantially rectangular cross sectional shape of tubes 28 and 29 which serve to confine both the steam and liquor, the approximate velocities of the steam and liquor, as they swirl around the centrifugal separating unit, 29, after flashing in tube 28, are substantially equal, such having been calculated to be in the neighborhood of 100 ft. per second in the installation described herein. In this connection the cross sectional area of tubes 28 and 29 is preferably designed so that the pressure drop of the fluid as it emits from tube 26 thereinto does not exceed a pressure corresponding to 0.15 inch of mercury. As the separated steam and salt carrying liquor continue their course around the centrifugal separating unit, the steam is eventually drawn off via outlet 34 either directly to the atmosphere or under a vacuum, the latter of which may be supplied by a conventional condenser. The remaining salt carrying liquor continues to flow downwardly into the tail pipe section 40, such having reduced in temperature to approximately 227° F. The initial drop from elbow 35 to a point somewhere intermediate the length of pipe 40 and adjacent the petcocks 43 is substantially a free drop with the liquor maintaining a level within the tail pipe determined by periodically opening petcocks 43. The pump for unit 11 continues to recirculate the liquor with each succeeding passage thereof to the flasher unit thus serving to further evaporate the liquor. Periodically, concentrated slurry is drawn out of the evaporator system via the slurry discharge nipple 46 adjacent the elbow member 14 leading from the discharge side of the pump 11. I have found that an evaporator made and operated as described heretofore will provide good separation between steam and salt brine under the conditions wherein the brine through the flasher flows at the rate of some 500 to 2000 gallons per minute which serves to liberate steam through outlet 34 at corresponding rates of 5000 to 18,000 lbs. per hour. Under these conditions the steam pressure in the flasher will lie within the range of from 21 inches of mercury column to atmospheric pressure. At substantially atmospheric pressure and with a 10,000 lb. per hour liberated steam flow, the volume of steam passing through the flasher is approximately 5,000 cubic feet per minute with a velocity of somewhere in the neighborhood of 100 ft. per second. When the evaporator is operating with a rate of flow through the heat exchanger of 5000 lb. of steam per hour at 15 lb. gauge and the brine through the flasher is flowing within the rate range of 500 to 2,000 gallons per minute, salt is produced and taken from the flasher through the slurry nipple 46 at approximately 1667 lbs. of salt per hour.

It will be recognized that as the heated brine passes upwardly through the discharge pipe 21 to the flasher unit tubes 28 and 29, its temperature ranges between 230° and 234° F. while the temperature of the liquor after its passage through the flasher, as heretofore set forth, is substantially at 227° F. This differential in temperature is primarily the result of the heat lost in evaporating the brine in the flasher unit.

It will be appreciated that by virtue of the substantially rectangular configuration of the flasher pipe 28 and 29, I am enabled to effectively separate the volatilized steam from the salt carrying liquor in an efficient manner almost entirely by means of the centrifugal and centripetal forces effect thereon. It also should be recognized that the line of demarkation between the steam and the salt carrying liquor is rather definite, with the centrifugal force serving to drive the heavier salt carrying liquid particles to the outside curve 50 of the flasher pipe 29 and conversely centripetally forcing the light volatilized steam particles toward the inside curve 52 thereof. Further, due to the fact that the vent opening 34 is positioned near the end of the curved centrifugal separator pipe 29, there is little interference with the centrifugal functioning when drawing the vapor therefrom, since the separated liquid and vapor have passed their point of maximum velocity and centrifugal separation somewhere prior to reaching the vent tube 34. For this reason, entrainment of heavier salt carrying particles in the volatilized vapor is reduced to a minimum, quite contrary to the normal conditions which prevail in the presently familiar separators of this class. Further, by virtue of the design of separator unit 29, the velocities of the volatilized steam particles and the heavier salt carrying liquor particles flowing through tube 29 are substantially equal, which permits a minimum of turbulence between the two liquid bodies as they pursue their course around the curvilinear track of the flasher and separator unit. This latter feature makes for a minimum tendency of the heavier liquor particles to entrap small amounts of the lighter volatilized particles and likewise reduces any tendencies of the volatilized particles of steam to entrain particles of the heavier salt carrying liquor; such making for a much cleaner and more efficient separation of the two liquids than has heretofore been known to the art.

While I have herein shown and demonstrated one form in which the features of my invention may occur, it readily will be recognized that the various sizes, dimensions and specifications of the several piping arrangements and energy producing units associated therewith may be varied to meet the conditions of a desired installation. In general a flasher of a larger capacity may be constructed by simply increasing the total height or length of the heat exchanger discharge tube 21 and the tail pipe 40, but leaving their internal and external diameters the same. Further, it will be understood that various materials may be utilized in constructing a flasher of this type with cast iron being preferred in some instances to steel because of its superior resistance to mild corrosion. Preferably the several tubes described herein are most satisfactorily constructed of iron, copper, aluminum, lead, bronze, nickel or other non-corrosive metals.

Additionally, one familiar with the art will recognize that several of my single effect evaporators, as set forth herein, may be arranged in series connection to create a multiple effect evaporator having like operational characteristics, according to conventional practice in the art, without departing from the spirit of my invention.

It further will be appreciated that the several structural and functional features as heretofore illustrated provide for a new and improved single effect flash evaporator heretofore untaught in the art and that by virtue of its nature I do not wish the scope of my invention to be limited by the materials, sizes, velocities, capacities and the like heretofore described other than as set forth in the following appended claims.

I claim:

1. For use in separating vapor particles from heated liquid being circulated under pressure, a flasher unit comprising a substantially U-shaped hollow metal tube having inlet and outlet ends, said tube bearing a uniform internal cross section substantially throughout its curved length, a diverging throat portion formed adjacent the inlet end to said tube adapted to permit rapid expansion of said liquid immediately after its introduction therein, and vapor outlet means formed adjacent the outlet end of said tube and communicating with the inside curve thereof; the curvilinear configuration of said tube serving to change the direction of flow of said heated liquid therein whereby certain vapor particles of the said liquid, flashed therefrom, are separated to the inside curve of said tube from other heavier liquid particles thereof; the said separated liquid and vapor particles being respectively centrifugally and centripetally forced toward opposite walls of said tube substantially throughout their entire course of flow therein; said vapor being withdrawn from said tube via said vapor outlet.

2. A forced circulation, single effect, flash evaporator of the class described, comprising a circulating pump, a heat exchanger, a liquid discharge tube communicating with and extending vertically from the discharge outlet of said heat exchanger, a vertical tail pipe having a substantially larger diameter than said discharge tube, extending vertically from said pump and communicating with the suction side thereof; pipe means interconnecting said pump and heat exchanger, a horizontal curvilinear separator tube, having single inlet and outlet openings at its opposite ends, communicating between the upper ends of said discharge tube and tail pipe, a divergent throat portion at the inlet end of said separator tube for flashing liquid as it enters the same, and a single vapor outlet means entering said separator tube at a point adjacent its outlet end and from the inside curve thereof, said pump serving to circulate pressurized liquid through said heat exchanger, discharge and separator tubes; said heat exchanger serving to elevate the temperature of said liquid, and said separator tube serving centrifugally and centripetally to separate said liquid after flashing into separate streams of vapor and concentrated liquor, the said vapor being withdrawn from the inside curve of said separator tube via said vapor outlet and said liquor discharging through the outlet end of said separator tube into said discharge tube.

3. In a single effect flash evaporator of the class described, a centrifugal flasher tube innerconnecting a vertical discharge tube and a vertical tail pipe through which fluid to be separated is circulated under pressure, said flasher unit comprising, a substantially rectangular cross sectioned, reentrantly bent, U-shaped, separator tube communicating horizontally between the upper ends of said discharge tube and tail pipe, a divergent flasher throat portion at the entry end of said separator tube and communicating with said discharge tube, fluid under pressure being discharged from said discharge tube into said throat portion wherein it is rapidly expanded and discharged into said separator tube which changes its course of flow violently at high velocities, to the end that heavier solute carrying particles of fluid are driven to the outside curve of said separator tube by centrifugal force and lighter volatilized particles therein are simultaneously driven to the inside curve of the separator tube by centripetal force, said fluid and volatilized particles flowing within said flasher tube in separated streams at substantially like velocities which are subjected to continual separating forces substantially throughout their entire course of flow in said separator tube; and a vapor outlet means opening into said separator tube along its inside curve and adjacent its discharge end for the exit of said volatilized particles therethrough.

References Cited in the file of this patent

UNITED STATES PATENTS

| Number | Name | Date |
| --- | --- | --- |
| 438,385 | Peck | Oct. 14, 1890 |
| 521,974 | Cooper | June 26, 1894 |
| 1,006,823 | Block | Oct. 24, 1911 |
| 1,306,003 | Good | June 10, 1919 |
| 1,392,656 | Rew | Oct. 4, 1921 |
| 1,985,250 | Goss et al. | Dec. 25, 1934 |
| 2,554,138 | Cross | May 22, 1951 |